US010735269B2

(12) United States Patent
Wilson

(10) Patent No.: US 10,735,269 B2
(45) Date of Patent: Aug. 4, 2020

(54) APPARATUS AND METHOD FOR DYNAMIC DISCOVERY AND VISUAL MAPPING OF COMPUTER NETWORKS

(71) Applicant: Bradley E Wilson, Clifton Park, NY (US)

(72) Inventor: Bradley E Wilson, Clifton Park, NY (US)

(73) Assignee: QoS Networking, Inc., Clifton Park, NY (US)

( * ) Notice: Subject to any disclaimer, the term of this patent is extended or adjusted under 35 U.S.C. 154(b) by 152 days.

(21) Appl. No.: 16/119,972

(22) Filed: Aug. 31, 2018

(65) Prior Publication Data

US 2020/0076698 A1 Mar. 5, 2020

(51) Int. Cl.
*H04L 12/24* (2006.01)
*H04L 29/12* (2006.01)
*G06F 16/22* (2019.01)
*H04L 29/08* (2006.01)
*H04L 12/46* (2006.01)

(52) U.S. Cl.
CPC .......... *H04L 41/12* (2013.01); *G06F 16/2282* (2019.01); *H04L 61/2007* (2013.01); *H04L 12/4641* (2013.01); *H04L 69/324* (2013.01); *H04L 69/325* (2013.01)

(58) Field of Classification Search
CPC ...................................... H04L 41/12
USPC ........................................... 709/223
See application file for complete search history.

(56) References Cited

U.S. PATENT DOCUMENTS

| 5,412,573 | A | * | 5/1995 | Barnea | G01C 21/367 340/990 |
| 5,751,852 | A | * | 5/1998 | Marimont | G06K 9/4638 382/180 |
| 5,892,517 | A | * | 4/1999 | Rich | G06T 1/60 345/582 |
| 5,923,018 | A | * | 7/1999 | Kameda | G06Q 50/24 235/385 |
| 6,519,231 | B1 | * | 2/2003 | Ding | H04L 12/44 370/256 |
| 6,697,338 | B1 | * | 2/2004 | Breitbart | H04L 41/12 370/254 |
| 7,523,184 | B2 | * | 4/2009 | Kortright | H04L 41/082 709/220 |

(Continued)

OTHER PUBLICATIONS

Narten et al., "Neighbor Discovery for IP version 6 (IPv6)", RFC 4861, 2007 (Year: 2007).*

*Primary Examiner* — Ondrej C Vostal

(57) ABSTRACT

An apparatus and method to dynamically discover and visually map computer networks comprising plurality of devices, physically and logically, is disclosed. The apparatus comprises a server including a processor and memory. The server is configured to implement a connection-oriented network protocol to issue command line interface (CLI) commands for more efficient and reliable data collection of a plurality of networked devices of a network. The server is further configured to extract information via a parser from a command output retrieved in response to the issued command. The server is further configured to store the extracted information in a database for retrieval. Then the stored information is utilized to create network topology map including a physical topology map, a virtual physical topology map and a virtual logical topology map.

11 Claims, 20 Drawing Sheets

(56) References Cited

U.S. PATENT DOCUMENTS

| | | | | |
|---|---|---|---|---|
| 7,599,283 B1 * | 10/2009 | Varier | H04L 45/586 | 370/216 |
| 8,082,362 B1 * | 12/2011 | Ewing | H04L 43/50 | 709/238 |
| 8,386,593 B1 * | 2/2013 | Gao | H04L 41/085 | 709/223 |
| 9,749,287 B2 * | 8/2017 | Donley | H04L 61/2015 | |
| 10,536,518 B1 * | 1/2020 | Streete | H04L 41/0823 | |
| 2003/0041238 A1 * | 2/2003 | French | H04L 29/06 | 713/153 |
| 2003/0084135 A1 * | 5/2003 | Narain | H04L 41/0853 | 709/223 |
| 2003/0110252 A1 * | 6/2003 | Yang-Huffman | H04Q 3/0087 | 709/224 |
| 2003/0229686 A1 * | 12/2003 | Kortright | H04L 67/34 | 709/220 |
| 2006/0168208 A1 * | 7/2006 | Nagami | H04L 41/0893 | 709/224 |
| 2006/0190579 A1 * | 8/2006 | Rachniowski | G06F 9/45512 | 709/223 |
| 2007/0280134 A1 * | 12/2007 | Ramanan | H04L 41/12 | 370/254 |
| 2009/0324222 A1 * | 12/2009 | Kunjidhapatham | H04L 45/62 | 398/58 |
| 2011/0301843 A1 * | 12/2011 | Gale | G09B 29/007 | 701/300 |
| 2013/0073486 A1 * | 3/2013 | Petrick | H04L 41/142 | 706/12 |
| 2014/0009500 A1 * | 1/2014 | Laine | G06F 1/1626 | 345/659 |
| 2014/0254428 A1 * | 9/2014 | Visser | H04L 45/02 | 370/254 |
| 2016/0359687 A1 * | 12/2016 | Gao | H04L 41/12 | |
| 2017/0099182 A1 * | 4/2017 | DeBolle | H04L 41/12 | |
| 2017/0373973 A1 * | 12/2017 | Bickhart | H04L 12/4641 | |
| 2018/0139104 A1 * | 5/2018 | Seddigh | H04L 41/0213 | |
| 2018/0331895 A1 * | 11/2018 | Tang | H04L 41/0803 | |
| 2019/0068401 A1 * | 2/2019 | Johnsen | H04L 45/586 | |

* cited by examiner

| Credential Manager | | | | | | — □ × |
|---|---|---|---|---|---|---|

Drag a column header here to group by that column

Available Credentials

| No. | Priority | Entry Type | Entry | User Name | Password | Enable |
|---|---|---|---|---|---|---|
| 6 | 6 | Host IP | 192.168.240.108 | brad.wilson | ******** | ******** |
| 7 | 7 | Host IP | 192.168.120.20 | brad.wilson | ********** | ********** |
| 8 | 8 | Host IP | 192.168.120.3 | admin | **** | **** |
| 10 | 10 | Host IP | 192.168.240.201 | qos | ********** | ********** |
| 13 | 13 | Host IP | 192.168.240.200 | qos | ********** | ********** |
| 14 | 14 | Host IP | 192.168.120.21 | brad.wilson | ********* | ********* |
| 16 | 16 | Host IP | 192.168.240.6 | brad.wilson | ********* | ********* |
| 18 | 19 | Host IP | 192.168.224.1 | brad.wilson | ********* | ********* |
| 19 | 20 | Host IP | 192.168.240.5 | brad.wilson | ********* | ********* |
| 20 | 21 | Host IP | 192.168.240.7 | brad.wilson | ********* | ********* |
| 21 | 22 | Network Address | 10.20.10.0/24 | admin | ***** | ***** |
| 22 | 23 | Network Address | 10.20.10.0/24 | bwilson | ********* | ********* |

⊕ Add   × Delete   ⊟ Delete All   ☒ Close

| Name | Type |
|---|---|
| All Devices | |
| QOSTESTSW01 | Switch |
| QOSTESTSW01.blue | Switch |
| QOSTESTSW01.green | Switch |
| QOSTESTSW01.red | Switch |
| QOSTESTSW01.yellow | Switch |
| sw8 | Switch |
| QOSTESTSW02 | Switch |
| QOSTESTSW02.blue | Switch |
| QOSTESTSW02.green | Switch |
| QOSTESTSW02.red | Switch |
| QOSTESTSW02.yellow | Switch |
| 3560a | Switch |
| 3560a.app | Switch |
| 3560a.dist | Switch |
| 3560a.external | Switch |
| 3560a.internet | Switch |
| 3560B | Switch |
| 3560B.app | Switch |
| 3560B.dist | Switch |
| 3560B.external | Switch |
| 3560B.internet | Switch |
| QOSTESTFW01 | Firewall |
| asa4-pri | Firewall |
| asa4-pri.ADMIN | Firewall |
| asa4-pri.TEST | Firewall |
| asa4-pri.PROD | Firewall |
| asa4-pri.INTERNAL | Firewall |
| asa4-pri.INTERNET | Firewall |
| asa4-sec | Firewall |
| asa4-sec.ADMIN | Firewall |
| asa4-sec.TEST | Firewall |
| asa4-sec.PROD | Firewall |
| asa4-sec.INTERNAL | Firewall |
| asa4-sec.INTERNET | Firewall |
| Lab_2811a | Switch |
| Lab_2811a.admin | Switch |
| Lab_2811a.wan | Switch |
| Lab_2811b | Switch |
| Lab_2811b.admin | Switch |
| Lab_2811b.wan | Switch |

| ARP Table - Data Grid | | | | | |
|---|---|---|---|---|---|
| Device Id | sys Dev Name | v Physically Logical | Ip Net To Media Net Ad. | Ip Net To Media Phys A. | If Descr |
| 288 | QOSTESTSW01 | red | 192.168.122.2 | 000b.5f90.aa80 | Vlan122 |
| 288 | QOSTESTSW01 | red | 192.168.122.1 | 0011.5c0e.7d00 | Vlan122 |
| 288 | QOSTESTSW01 | red | 192.168.123.1 | 0011.5c0e.7d00 | Vlan123 |

Drag a column header here to group by that column

[Close]

FIG. 19

APPARATUS AND METHOD FOR DYNAMIC DISCOVERY AND VISUAL MAPPING OF COMPUTER NETWORKS

BACKGROUND OF THE INVENTION

Networks have grown considerably over the years making it difficult to keep network drawings up to date. Generally, it could take days and sometimes weeks to create a network drawing manually for a large enterprise network. The network engineer must connect to all network devices, pull many tables of data, manually parse the data and use a drawing program to create the network drawing. During the process, the network engineer will need to create the best layout for the drawings which includes the decisions on where to place each device, how to represent each device, how to connect each device, etc. And, if the network engineer changes his mind through the process, he will need to run through the entire process again. This requires a great deal of time. Also, the drawing is immediately outdated as soon as network devices are added, removed or reconfigured. Another problem is the lack of skill in creating the drawing. Most network engineers spend much time in fixing problems and left with little or no time for creating drawings. Thus, the skill is never taught to anyone. Sometimes network consultants are called-in to support a network that they did not design or implement. The network consultant further needs to identify the devices, connections between the devices and create a network drawing before they could provide support.

Automated network drawings have been available for years. For many years products have relied primarily on SNMP to collect data from network devices. SNMP uses UDP (user datagram protocol), a connectionless protocol that is not as reliable as a connection-oriented protocol. SNMP commands were also non-intuitive and difficult to use. Existing systems create physical drawings or physiological drawings. Further, logical drawings were not created, and even if they were created, there was no distinction between physical (layer 2) and logical (layer 3) devices or connections.

Therefore, there is a need for an apparatus and method to dynamically discover networked devices to create physical and logical network topology maps. Further, there is a need for an apparatus that implements Transmission Control Protocol (TCP), a connection-oriented protocol for more efficient and reliable data collection. Further, there is need for an apparatus that creates a unique visualization of networks implementing network driven hierarchical virtual physical (vPhysical) and virtual logical (vLogical) formats.

SUMMARY OF THE INVENTION

The present invention discloses an apparatus and method to dynamically discover networked devices to create network topology maps. The apparatus comprises a server including a processor and a memory. The server is configured to implement a connection-oriented network protocol to issue command line interface (CLI) commands for collecting data of a plurality of devices of a network. The server is further configured to extract information via a parser from command output retrieved in response to the issued command. The server is further configured to store the extracted information in a database for retrieval. Then the stored information is utilized to create network topology maps.

One aspect of the present disclosure is directed to an apparatus to dynamically discover networked devices to create network topology maps, comprising: a server comprising a processor and memory, wherein the server is configured to a) implement a connection-oriented network protocol command to issue command line interface (CLI) commands to collect data of a plurality of networked devices of a network; b) extract information via a parser from a command output retrieved in response to the issued command; c) store the extracted information in a database for retrieval, wherein the database comprises auto-discovery tables; and d) utilize the stored information to create a network topology map. In one embodiment, the network topology map comprises a physical topology map, a virtual physical topology map, or a virtual logical topology map. In an embodiment, the server is further configured to determine when two devices are not connected without using neighbor protocols or loop prevention technologies. In another embodiment, the server is further configured to determine the devices that are incorrectly determined as physically connected. In one embodiment, the server is further configured to insert a virtual device between devices that are incorrectly determined to be physically connected. In another embodiment, the server is further configured to determine the devices that are incorrectly determined as physically connected and insert a virtual device between devices that are incorrectly determined to be physically connected.

In one embodiment of the apparatus as disclosed herein, the server is further configured to display an oval type shape to represent Layer 3 IP subnets as they are displayed on at least one of a logical and Virtual Logical topology map, wherein one or more data elements relating to the Layer 3 IP Subnet are displayed, wherein the oval shape is the end connection point for devices connected to a Layer 3 IP subnet. In one embodiment, the server is further configured to display a rectangle type shape to represent Layer 2 VLANs as they are displayed on at least one of a physical and virtual Physical topology maps, wherein one or more data elements relating to the Layer 2 VLAN are displayed, wherein the rectangle shape is placed as the intersection of a connection between two devices.

In one embodiment of the apparatus, the server is further configured to determine characteristics of the devices, wherein the characteristics includes physical only characteristics, virtual physical characteristics or virtual logical characteristics, wherein the device appears one or more times in at least one of a virtual physical, and virtual logical topology map. In another embodiment, the server is further configured to display devices in cell formatted object with one or more cells used for a device image and one or more cells used for device information. In a related embodiment, the color of the cell is configured to change manually or dynamically based on information retrieved from or about the device.

In one embodiment, the database comprises auto-discovery tables. In one embodiment, the server further configured to dynamically add devices to the auto-discovery table and to determine if the device need to be polled, how the device should be polled and what happens when polling fails for devices and to determine when to clear the auto-discovery tables and start adding devices to the auto-discovery tables. In another embodiment, the server is configured to display a rectangular shaped container to group vPhysical and vLogical representations of devices and their associated connections to the Layer 3 subnets which are depicted as oval type shapes.

Another aspect of the present disclosure is directed to an apparatus to dynamically discover networked devices to create network topology map, comprising a server comprising a processor and memory, wherein the server configured to implement a connection-oriented network protocol command to issue command line interface (CLI) commands to collect data of a plurality of networked devices of a network; extract information via a parser from a command output retrieved in response to the issued command; store the extracted information in an auto-discovery table of a database for retrieval; dynamically add devices to the auto-discovery table of the database; poll the plurality of networked devices periodically; and utilize the stored information to create network topology map.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

FIG. 5B is a continuation of FIG. 5A.

FIG. 17 exemplarily illustrates a screenshot of a credential manager, according to an embodiment of the present invention.

FIG. 18 exemplarily illustrates a screenshot of a device list discovered in the network, according to an embodiment of the present invention.

FIG. 19 exemplarily illustrates screenshot of pop-up data grid containing an ARP table, according to an embodiment of the present invention.

DETAILED DESCRIPTION

Figure 1:
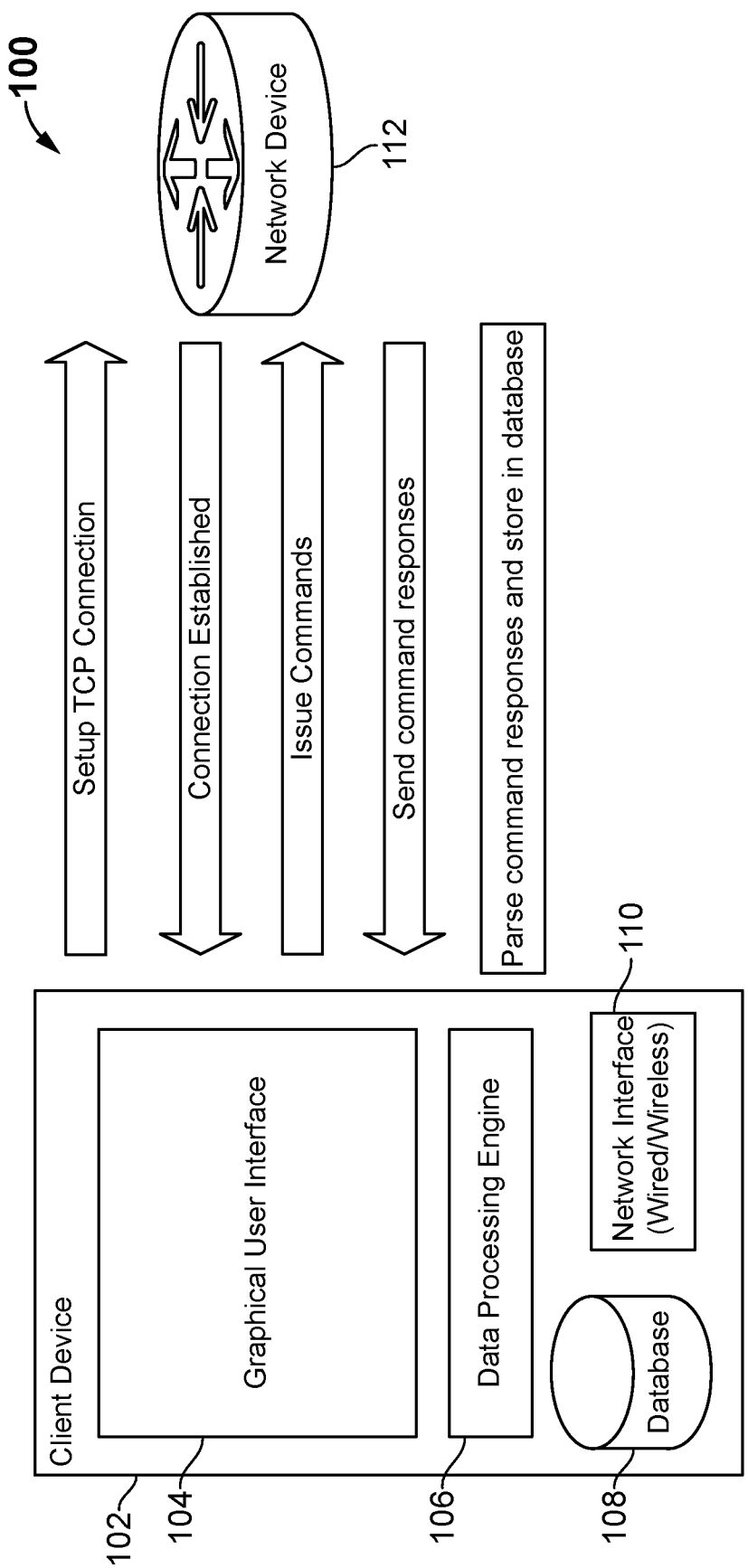
FIG. 1 is an environment of an apparatus implementing connection-oriented protocol to collect information from network devices, according to an embodiment of the present invention.

The present invention generally relates to a field of computer networks, and more particularly relates to an apparatus and method to dynamically discover networked devices for creating physical and logical network topology maps.

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

According to the present invention, an apparatus and method to dynamically discover and visually map computer networks physically and logically using commands, is disclosed. The apparatus comprises a server including a processor and a memory. The server is configured to implement a connection-oriented protocol to issue command line interface (CLI) commands for more efficient and reliable data collection of a plurality of devices in a network. The server is further configured to extract information via a parser from a command output retrieved in response to the issued command. The server is further configured to store the extracted information in a database for retrieval. Then the stored information is utilized to create network topology map.

In one example, the disclosure is directed to an apparatus to dynamically discover networked devices to create network topology map. The apparatus comprises a server comprising a processor and memory, wherein the server is configured to: implement a connection-oriented network protocol command to issue command line interface (CLI) commands to collect data of a plurality of networked devices of a network; extract information via a parser from a command output retrieved in response to the issued command; store the extracted information in a database for retrieval, wherein the database comprises auto-discovery tables; and utilize the stored information to create network topology map. The network topology map may comprise a physical topology map, a logical topology map, or a virtual logical topology map.

The server may be further configured to determine when two devices are not connected without using neighbor protocols or loop detection technologies. The server may further be configured to determine the devices that are incorrectly determined as physically connected and to insert a virtual device between devices that are incorrectly determined to be physically connected. The server may be further configured to display devices in cell formatted object with one or more cells used for a device image and one or more cells used for device information. Further, the cell's color may be configured to change manually or dynamically based on information retrieved from the device.

The apparatus may be configured to create a unique visualization of networks implementing virtual physical (vPhysical) and virtual logical (vLogical) formats. In one embodiment, the apparatus is further configured to draw a network comprising plurality of device of Layer 2 (L2) and Layer 3 logic (L3). In one example, the devices are arranged using L2 loop avoidance technologies and L3 routing protocol information. The drawing could be used for troubleshooting, analysis and asset management. The apparatus may be configured to implement auto discovery of network devices, and further enables to dynamically add devices to database and determine if a device needs to be polled, methodology to poll, cause for failure of polling operation and alternative polling operation. Also determines if the device data needs to be cleared and to start auto-discovery again.

Referring to FIG. 1 illustrates an environment 100 of the apparatus implementing connection-oriented protocol to collect information from network devices. The apparatus is coupled to the client device 102 comprising one or more network devices 112. The client device 102 includes a graphical user interface 104, a data processing engine 106, a database 108 and a network interface 110. In an embodiment, the network interface 110 is a wired component. In an embodiment, the network interface 110 is a wireless component. In an embodiment, the TCP connection is setup between the network device 112 and the client device 102. On establishing connection between the network device 112 and the client device 102, commands are issued to the network devices 112. The client device 102 receives response from the network device 112 and a parser implements logic to extract information from the response. The retrieved information is stored in the database 108 and utilized to create network topology maps and data grids.

Figure 2:
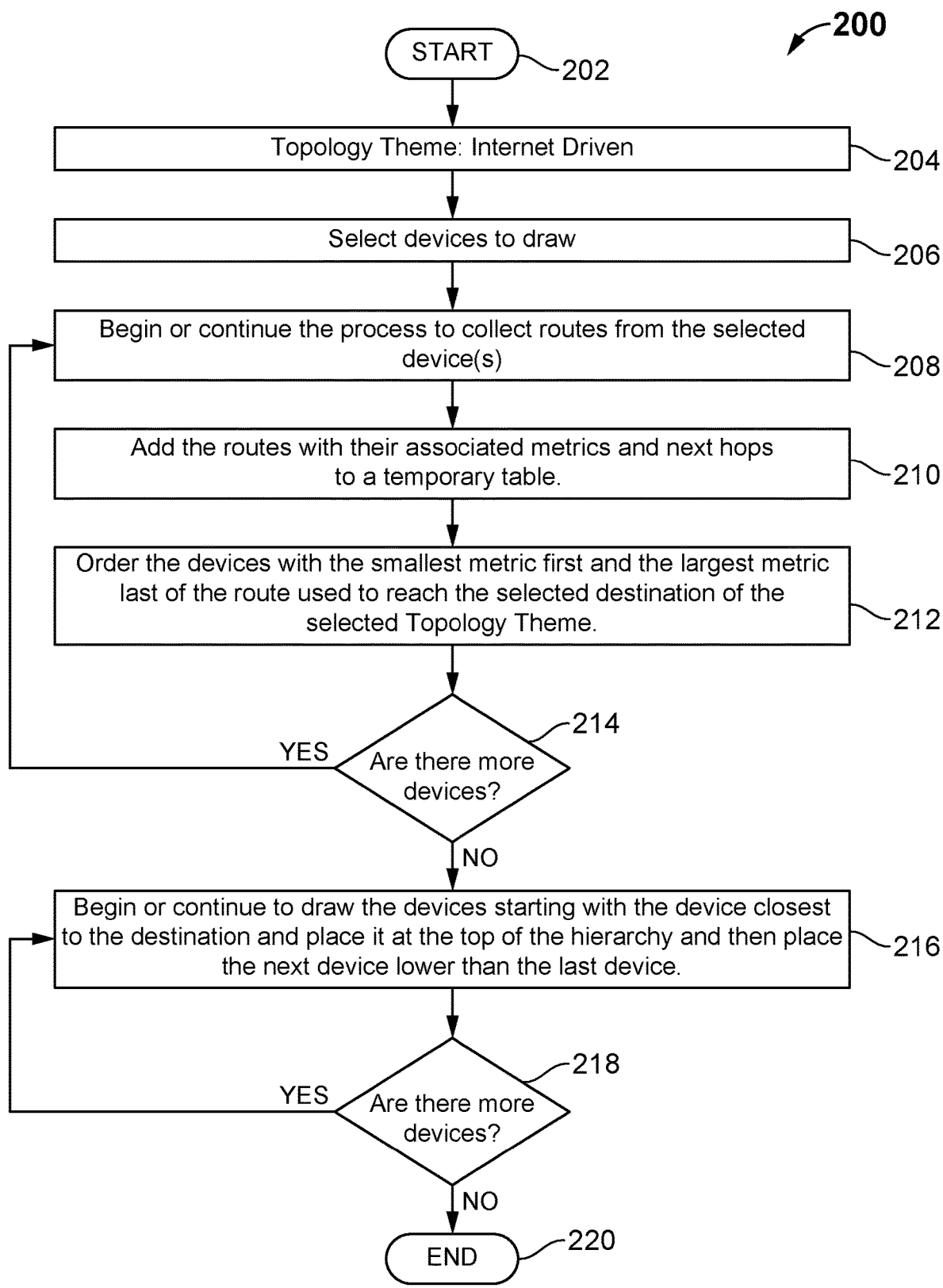
FIG. 2 is a flowchart illustrating a method to create a topology map, according to an embodiment of the present invention.

Referring to FIG. 2 is a flowchart of a methodology 200 to display a layer 3 route driven hierarchal topology map. The illustrated topology map theme is internet driven and a topology map based on the distance network device from the internet is created. At step 202, the process starts. At step 204, internet driven topology theme is selected. At step 206, one or more devices are selected to draw the network topology map. At step 208, the process to collect routes from the selected devices are initiated. At step 210, the routes with their associated metrics are added and next hops to a temporary table. At step 212, the device with the smallest metric are used first and the device with the largest metric are used last to reach the selected destination of the selected topology theme. At step 214, availability of devices is checked. If one or more devices are found, the process returns to step 208. At step 216, if no devices are found, a process to draw the devices is continued or initiated. The process starts with a device closest to the destination, which is placed at the top of the hierarchy. Then, the next device is placed lower than the last device. At step 218, availability of more devices is checked. If one or more device is found, the process returns to step 216. At step 220, the process ends.

Figure 3:
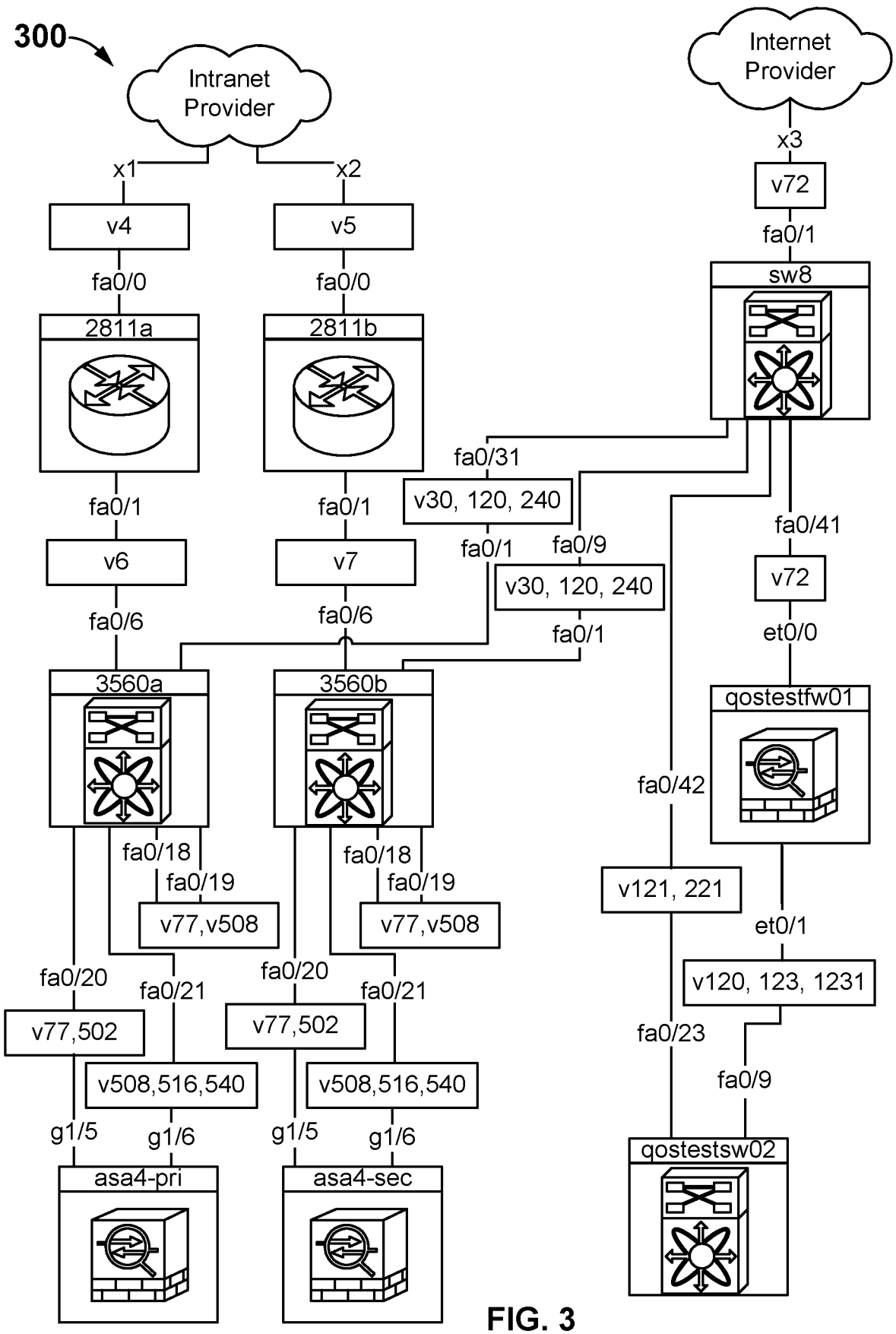
FIG. 3 shows a physical topology map, according to an embodiment of the present invention.

FIG. 3 shows a physical topology map 300, according to an embodiment of the present invention. The illustrated topology map 300 is the lowest level physical map where all devices are shown once, even though they could have virtual physical characteristics. Further, the devices 3560a, 3560b, asa4-pri and asa4-sec have virtual physical configurations but they are shown once as physical devices in the physical topology map.

Figure 4:
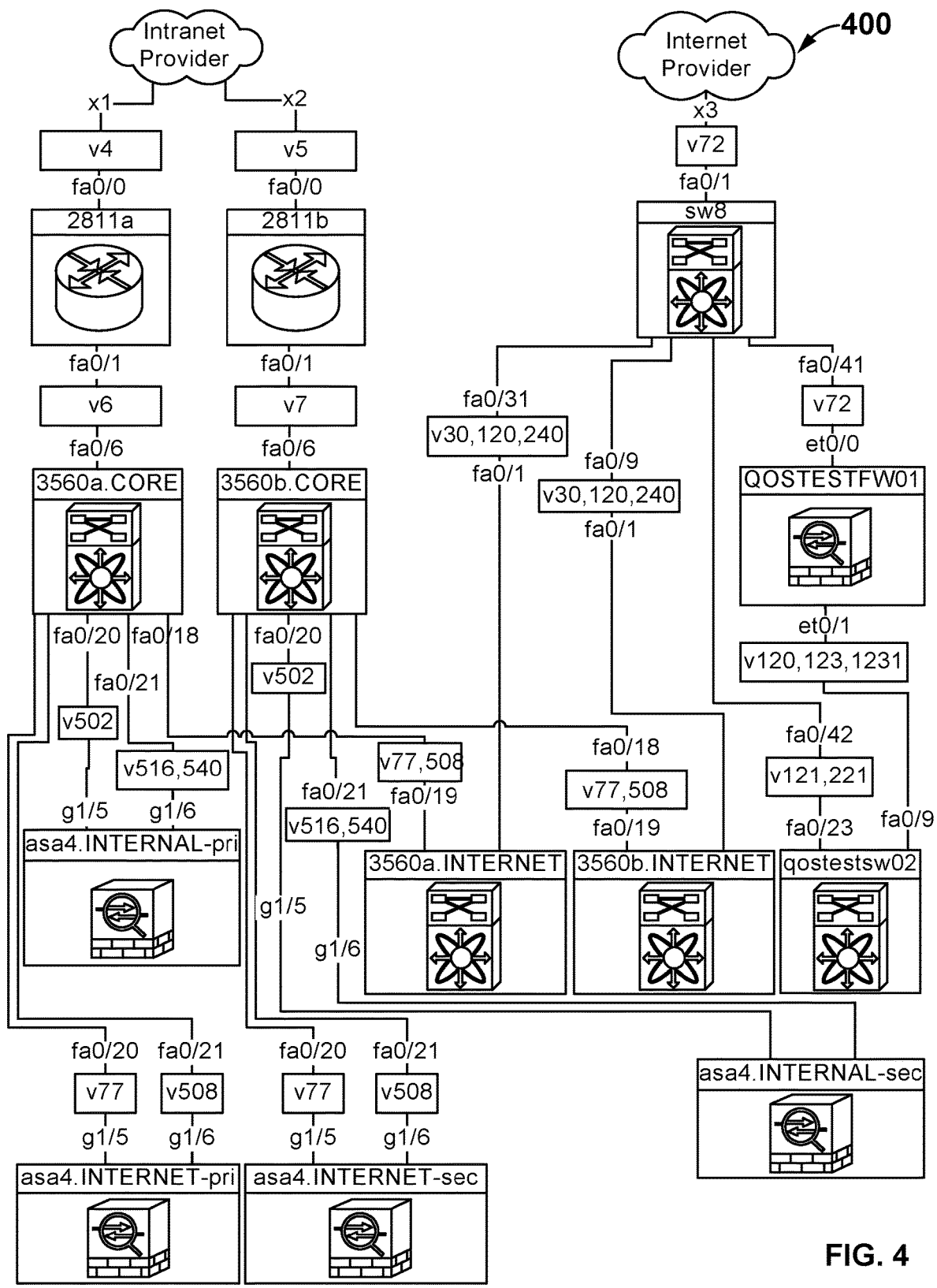
FIG. 4 shows a virtual physical topology map, according to an embodiment of the present invention.

FIG. 4 shows a virtual physical topology map 400, according to an embodiment of the present invention. The vPhysical topology map or virtual physical topology map 400 shows vPhysical characteristics for each device such as 3560a, 3560b, asa4-pri and asa4-sec device. There are two types of virtual physical configurations. The first type has separate physical interfaces allocated to each virtual physical configuration. The second type share physical interfaces only at the virtual layer. 3560a and 3560b have virtual physical configurations named CORE and INTERNET which have their own set of physical interfaces. A physical interface in one virtual physical configuration can't be used in another virtual physical configuration. Whereas asa4-pri and asa4-sec have virtual physical configurations named INTERNAL and INTERNET and they also have separate interfaces but the interfaces are virtually separate (and not physically). The physical interfaces g1/5 and g1/6 are virtually shared by both virtual physical configurations, shown in FIG. 4.

Figure 5A:
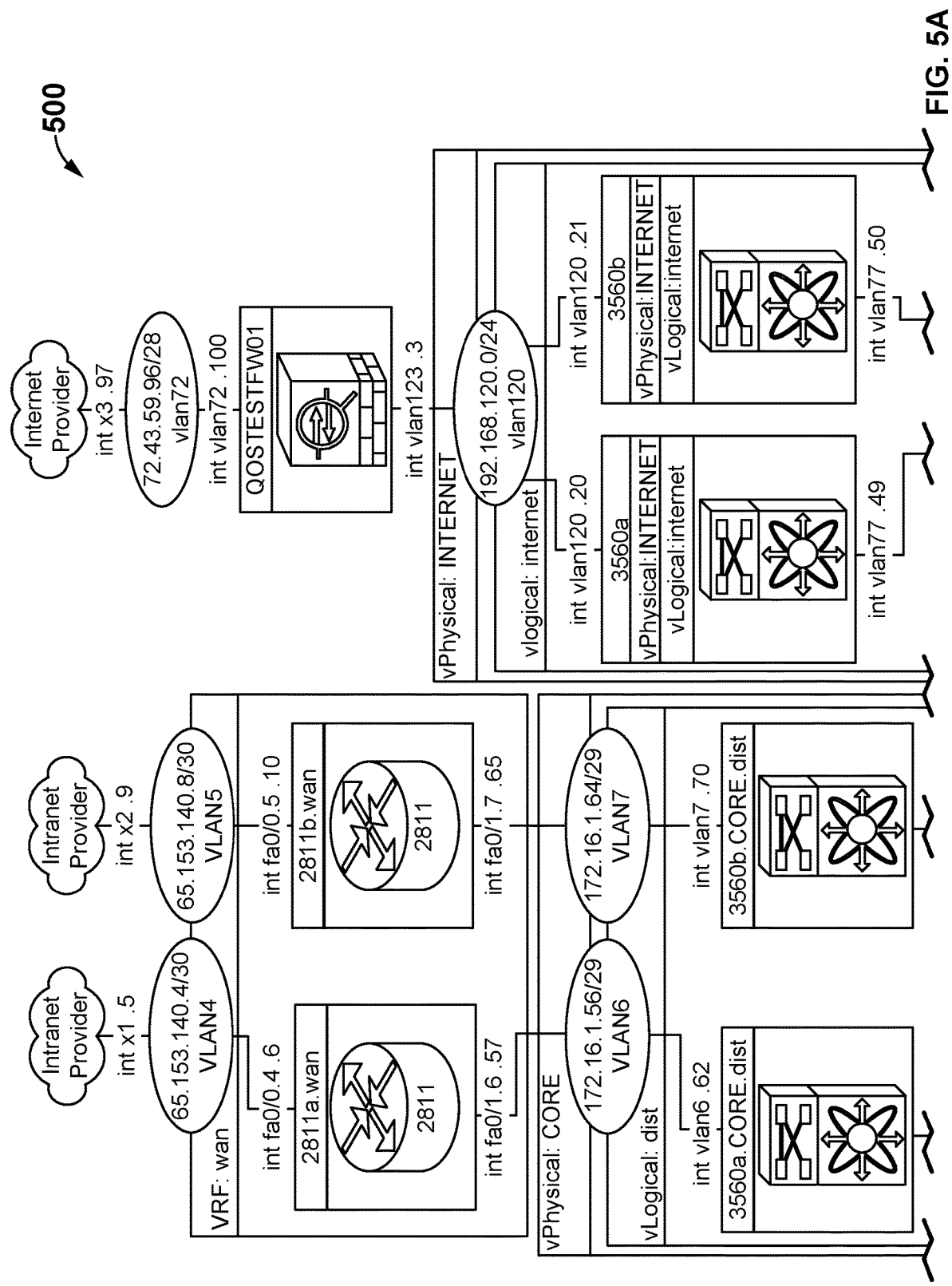
FIGS. 5A and 5B show a virtual logical topology map, according to an embodiment of the present invention.
Figure 5B:
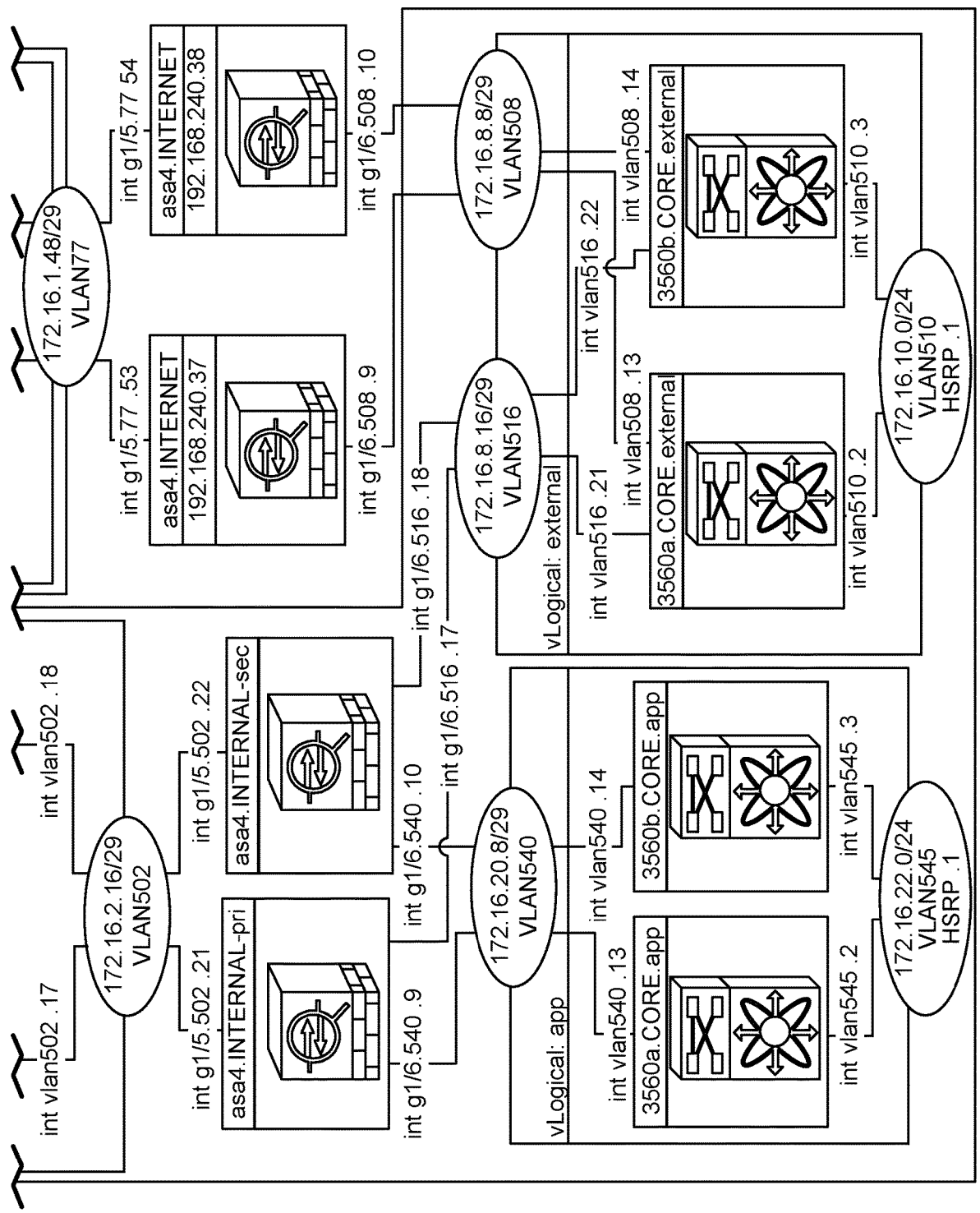

FIG. 5A and FIG. 5B show a virtual logical topology map 500, according to an embodiment of the present invention. The vLogical topology map or virtual logical topology map 500 shows vPhysical and vLogical characteristics for each device. Switches 3560a and 3560b are virtualized physically and logically while asa4-pri and asa4-sec are virtualized physically and 2811a, 2811b are virtualized logically. The vLogical topology map 500 includes all virtualized configurations from the vPhysical topology map and adds the virtual logical configurations. The primary type of virtual logical configuration consists of Layer 3 interface separation and the dynamic tables associated with Layer 3 interfaces. This includes Address Resolution Protocol tables and Layer 3 Routing Tables. Switches 3560a and 3560b have virtual logical configurations named app, dist, external and internet. Routers 2811a and 2811b have a virtual logical configuration named wan. The terms Logical and vLogical topologies are interchangeable names since there is no value in a logical topology containing virtualized devices. A vLogical topology refers to a topology with virtualized logical information. Hence, a vLogical topology includes devices if they are Logical or vLogical.

Figure 6:
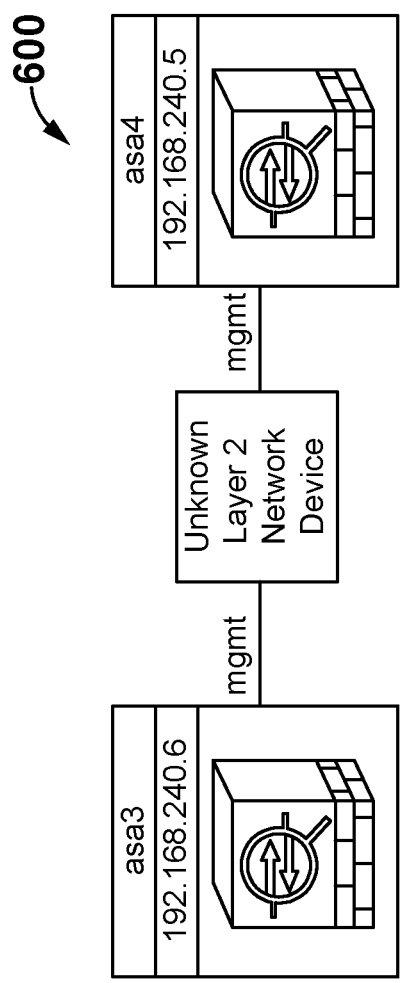
FIG. 6 illustrates an environment of incorrectly connected devices, according to an embodiment of the present invention.

In one embodiment, the apparatus is configured to determine when two devices are connected without using neighbor protocols or loop detection technologies. FIG. 6 illustrates an environment of 600 of incorrectly connected devices, according to an embodiment of the present invention. Consider, a scenario where Layer2 and Layer 3 information show two devices connected in a physical or vPhysical topology map when they are not physically connected. FIG. 6 shows two firewalls connected based on Layer 3 information. This can be very common for Layer 3 devices that do not have Layer 2 forwarding tables. The two firewalls determine that they are connected based on Layer 3 tables. Logic is required to detect when this happens.

Figure 7:
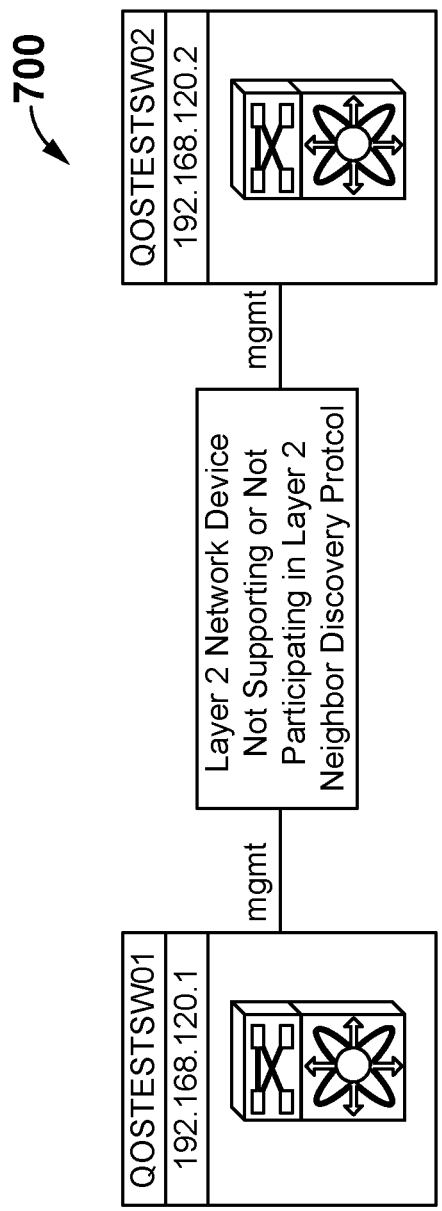
FIG. 7 illustrates an environment of incorrectly connected devices, according to another embodiment of the present invention.

FIG. 7 illustrates an environment 700 of incorrectly connected devices, according to another embodiment of the present invention. Consider, a scenario where Layer 2 Neighbor Discovery Protocols show that two devices are connected when they are not. This can happen when two Layer 2 or Layer 3 devices are connected through a third device that does not support the Layer 2 Neighbor Discovery Protocol. The third device will pass the Neighbor Discovery Protocol information between the two neighbors as if the third device does not exist. In an embodiment, the present invention is configured to address the scenario discussed in FIG. 6 and FIG. 7.

Figure 8:
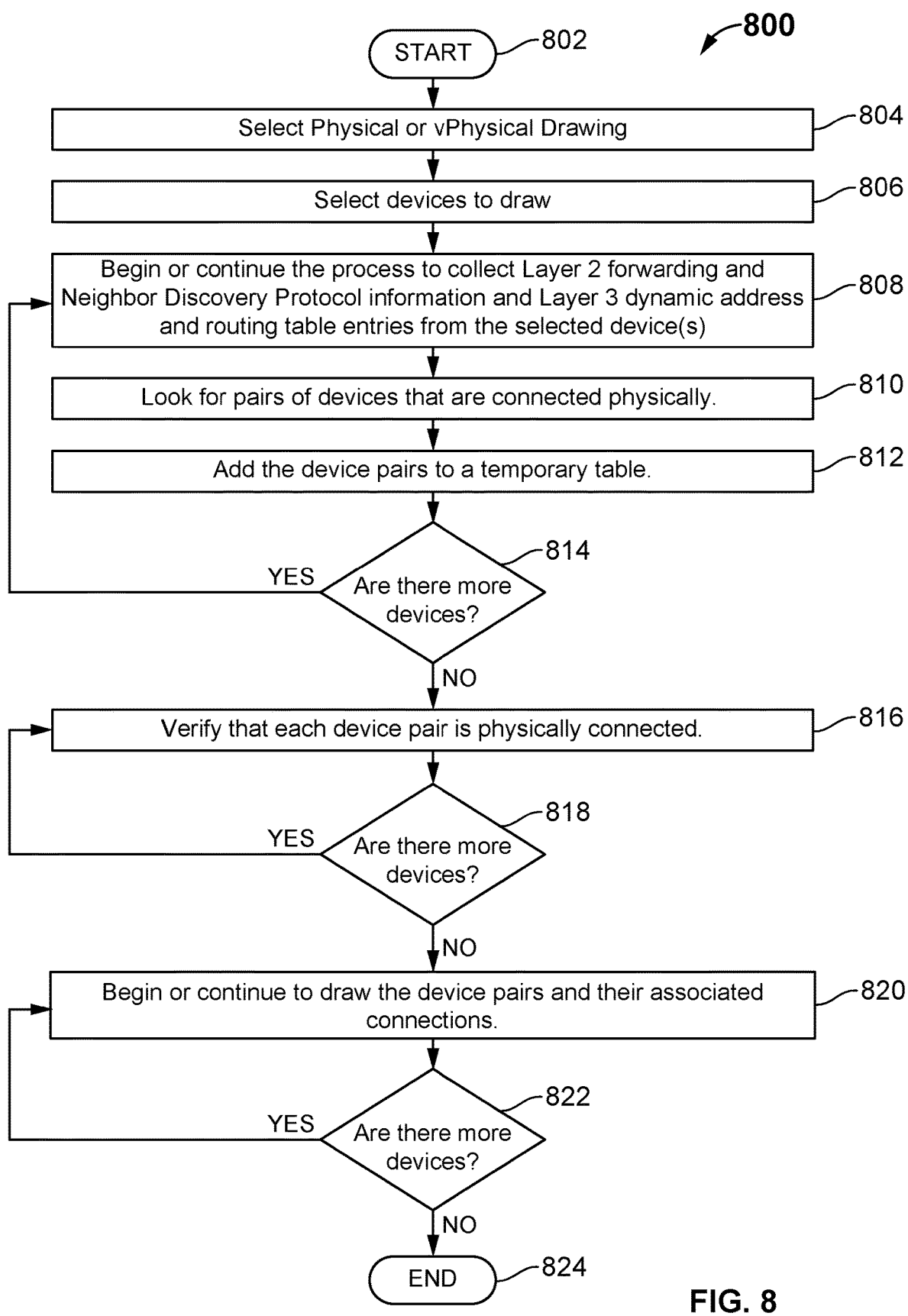
FIG. 8 is a flowchart illustrating a method to determine incorrectly connected devices, according to an embodiment of the present invention.

In one embodiment, the method 800 to determine when two devices are connected without using neighbor protocols or loop detection technologies is illustrated in FIG. 8. At step 802, the process starts. At step 804, at least one of a vPhysical or physical drawing is selected. At step 806, one or more devices are selected to draw. At step 808, the process to collect layer 2 forwarding and neighbour discovery protocol information and layer 3 dynamic address and routing table entries from the selected device(s) is continued or initiated. At step 810, pair of devices that are physically connected are identified. At step 812, the identified pairs are added to a temporary table. At step 814, availability of devices is checked. If one or more devices are found, the process returns to step 808. At step 816, if each device pair is physically connected, is verified. At step 818, availability of devices is checked. If one or more devices are found, the process returns to step 816. At step 820, a process to draw the device pairs and their associated connections is continued. At step 822, availability of devices is checked. If one or more devices are found, the process returns to step 820. At step 824, the process ends.

Figure 9:
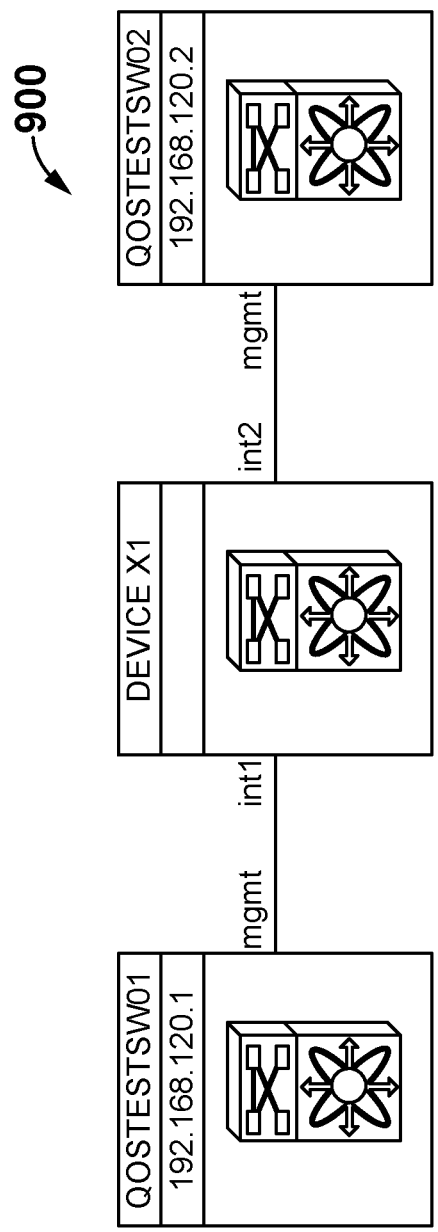
FIG. 9 illustrates a screenshot of insertion of virtual devices on determination of devices that are connected incorrectly, according to an embodiment of the present invention.

In another embodiment, the apparatus is further configured to insert a virtual device between devices that are incorrectly determined to be physically connected. FIG. 9 illustrates a screenshot 900 of insertion of virtual devices on determination of devices that are connected incorrectly, according to an embodiment of the present invention. The present invention provides an unknown virtual switch for insertion between two devices that are falsely determined as connected.

Figure 10:
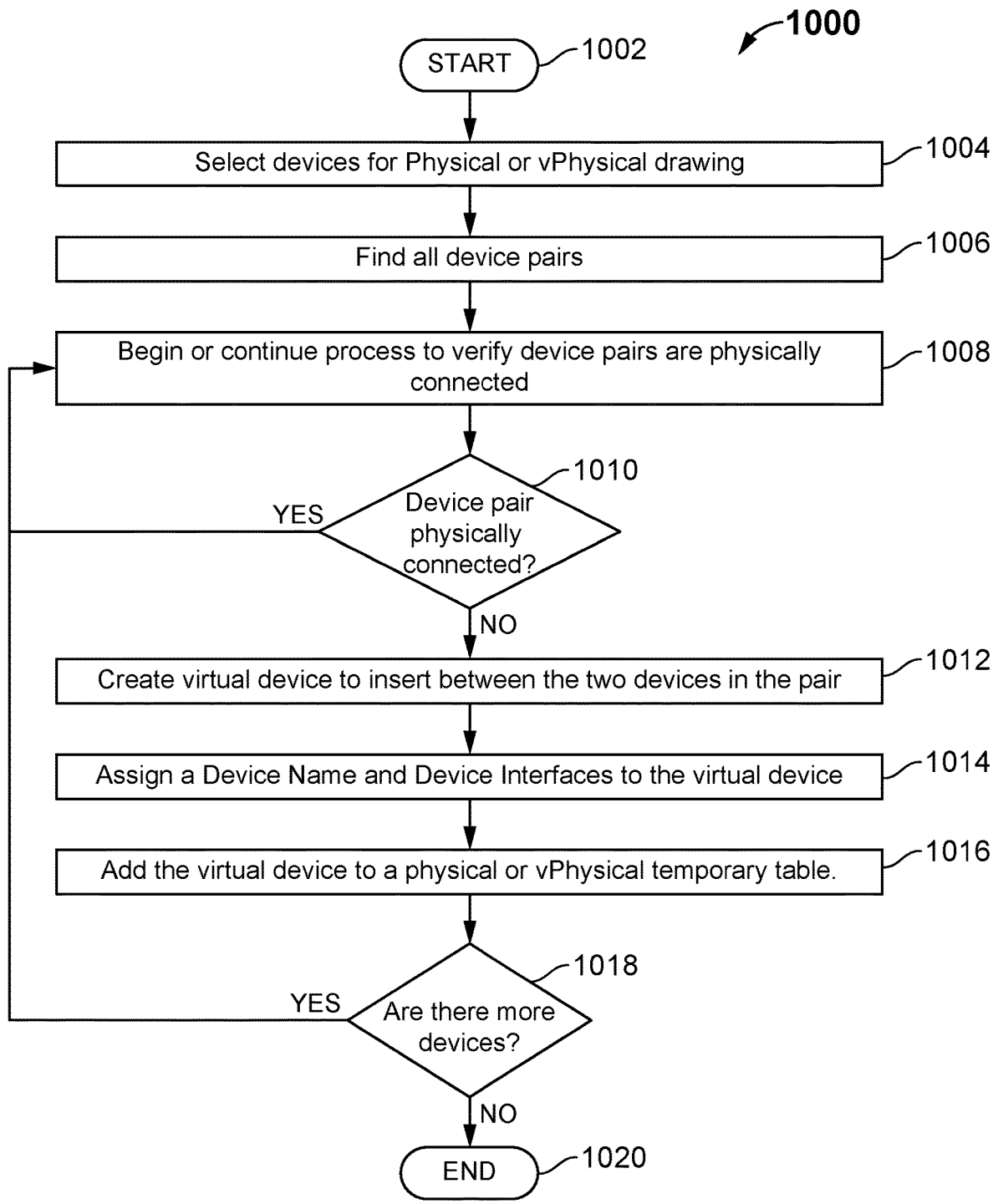
FIG. 10 is a flowchart illustrating a method for insertion of virtual devices on determination of devices that are connected incorrectly, according to an embodiment of the present invention.

FIG. 10 is a flowchart illustrating a method 1000 for insertion of virtual devices on determination of devices that are connected incorrectly, according to an embodiment of the present invention. At step 1002, the process starts. At step 1004, one or more devices are selected for drawing at least one of a physical or vPhysical topology map. At step 1006, all device pairs are found. At step 1008, the process to verify if device pairs are physically connected is initiated. At step 1010, if the device pair are physically connected, is verified. If the devices are physically connected, the process returns to step 1008. At step 1012, if the devices are not physically connected, a virtual device is created to insert between the two devices in a pair. At step 1014, a device name and device interface are assigned to the virtual device. At step 1016, the virtual device is added to the physical or vPhysical temporary table. At step 1018, availability of one or more device pair is checked. If one or more device pairs are found, the process returns to step 1008. At step 1020, the process ends.

In one embodiment, the apparatus provides a method to display an oval type shape to represent Layer 3 IP subnets as they are displayed on logical and or Virtual Logical topology maps, wherein one or more data elements are displayed relating to the Layer 3 IP Subnet, wherein the oval shape is the end connection point for the majority, if not all, devices connected to a Layer 3 IP subnet. Referring FIG. 11 exemplarily illustrates a screenshot 1100 of result on implementing the method to display an oval type shape to represent Layer 3 IP subnets.

One aspect of the present disclosure is directed to an apparatus to dynamically discover networked devices to create network topology map. The apparatus may comprise a server that includes a processor and memory, wherein the server is configured to implement a connection-oriented network protocol to issue command line interface (CLI) commands to collect data of a plurality of networked devices of a network, and extract information via a parser from a command output retrieved in response to the issued command. The server of the apparatus may further be configured to store the extracted information in a database for retrieval; and utilize the stored information to create network topology map. The network topology map may comprise a physical topology map, a logical topology map or a virtual logical topology map. The server may be further configured to determine the devices that are incorrectly determined as physically connected. The server may be further configured to insert a virtual device between devices that are incorrectly determined to be physically connected.

In one embodiment, the apparatus provides a method to display a rectangle type shape to represent Layer 2 VLANs as they are displayed on physical or virtual Physical topology maps, wherein one or more data elements are displayed relating to the Layer 2 VLAN, wherein the rectangle shape is placed as the intersection of a connection between two devices. Referring FIG. 12 exemplarily illustrates a screenshot 1200 of result obtained on implementing the method to display a rectangular type shape to contain Layer 2 VLAN.

The apparatus as disclosed includes a server that may be further configured to display an oval type shape to represent Layer 3 IP subnets as they are displayed on at least one of a logical and Virtual Logical topology maps, wherein one or more data elements relating to the Layer 3 IP Subnet are displayed, wherein the oval shape is the end connection point for devices connected to a Layer 3 IP subnet. The server may further be configured to display a rectangle type shape to represent Layer 2 VLANs as they are displayed on at least one of a physical and virtual Physical topology maps, wherein one or more data elements relating to the Layer 2 VLAN are displayed, wherein the rectangle shape is placed as the intersection of a connection between two devices.

Figure 11:
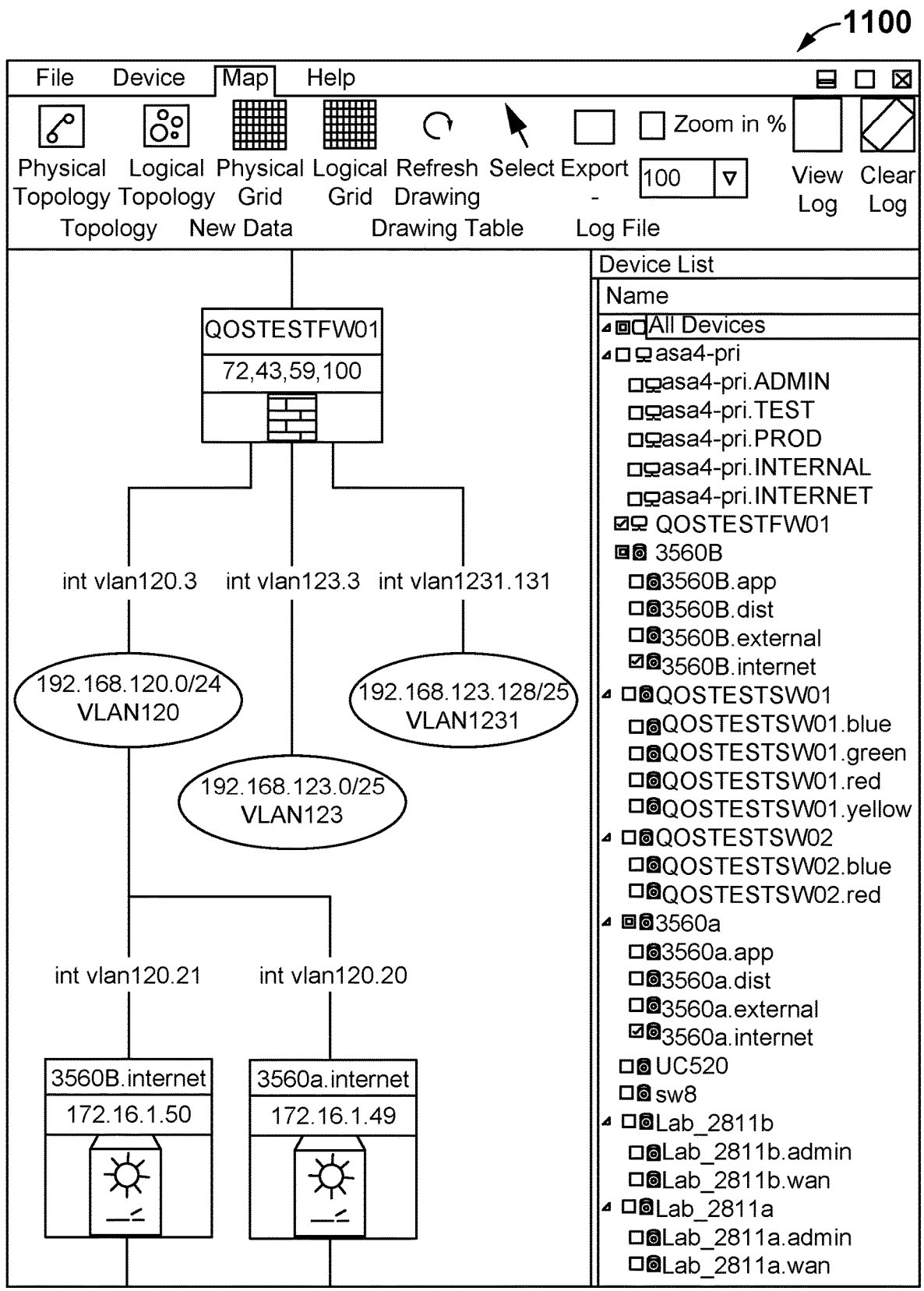
FIG. 11 is a screenshot of logical topology map comprising oval shape layer 3 IP subnet, according to an embodiment of the present invention.

FIG. 11 illustrates a logical topology map comprising an oval shape layer 3 IP subnet, according to an embodiment of the present invention. The present invention provides standardized multiple shapes to identify a specific network information. In one embodiment, the present invention provides ovals to represent layer 3 subnets. In one embodiment, the oval type shape and subnets appear in vLogical drawings. The layer 3 ovals are a sign that devices are connected to it share a common subnet. And in the vLogical topology map, all devices connect to the subnet oval. This helps to understand what devices in the network provide routing and where specific subnets reside.

Figure 12:
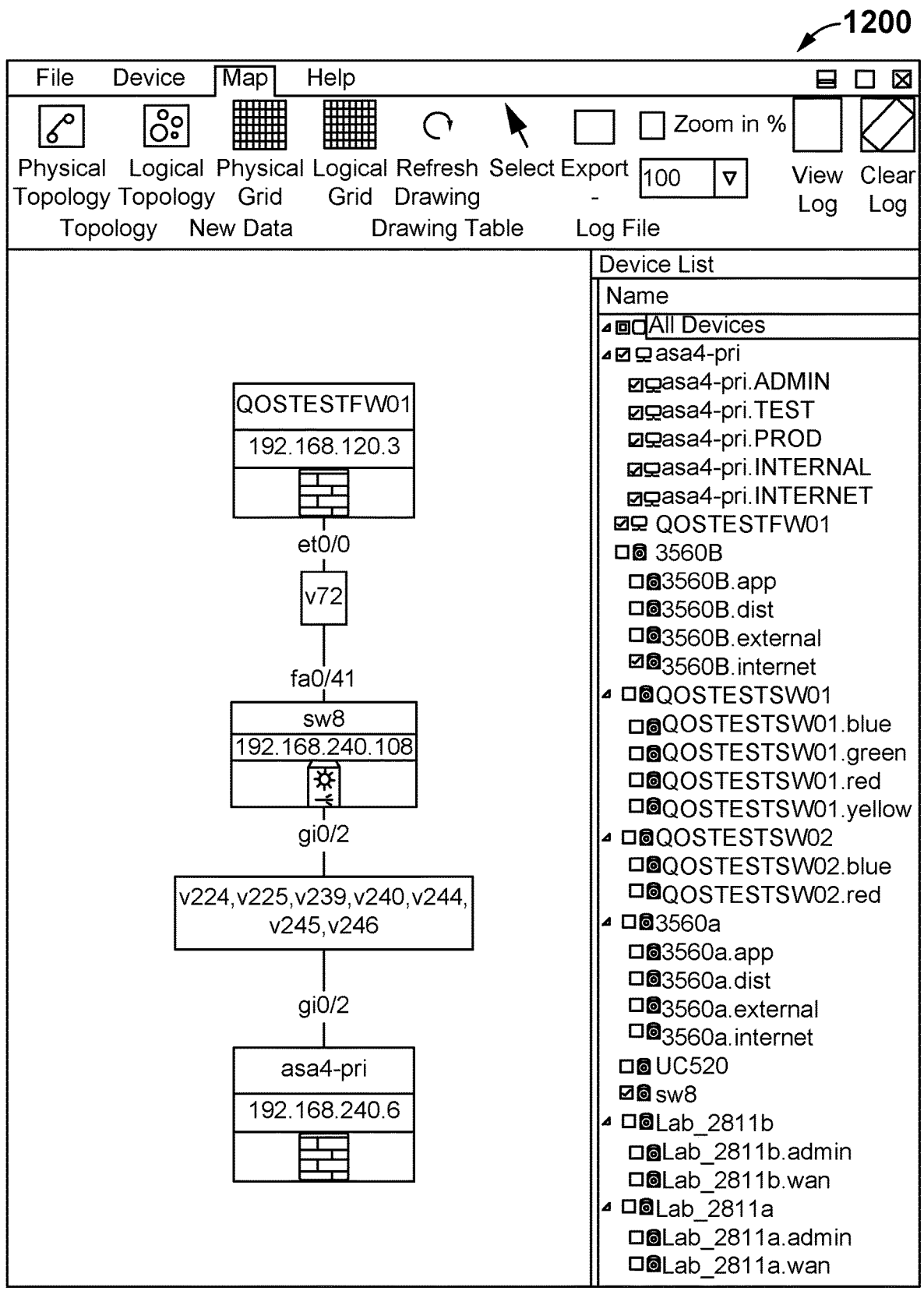
FIG. 12 illustrates a screenshot of physical topology map comprising rectangular shape layer 2 VLAN, according to an embodiment of the present invention.

FIG. 12 illustrates a physical topology map comprising rectangular shape layer 2 VLAN, according to an embodiment of the present invention. In one embodiment, the present invention provides rectangular type shapes, which are used to represent layer 2 VLANs. In one embodiment, the rectangular type shapes and VLANs appear in vPhysical drawings. The Layer 2 rectangles are a sign that the devices connected to it share a common VLAN. And in the vPhysical topology map, all devices connect to a VLAN rectangle except for a couple scenarios. This helps to understand what devices in the network provide Layer 2 forwarding information. The standardization of shapes to identify network information addresses the lack of network drawing standards in the industry, which is important to create logical and repeatable topology maps.

The server may further be configured to display a rectangular shaped container to group vPhysical and vLogical representations of devices and their associated connections to the Layer 3 subnets which are depicted as oval type shapes. Referring to FIGS. 5A and 5B, devices are grouped into virtualized network containers. There are two types of containers, which includes vPhysical containers and vLogical containers. The vPhysical containers groups virtualized configurations of one or multiple physically virtualized devices and vLogical containers groups one or multiple logically virtualized devices. The vPhysical container could contain one or more vLogical containers. Devices that have vPhysical configurations but don't have vLogical configurations could be grouped in vPhysical containers. This could happen when all the devices connections are connected to physically virtualized device that created the vPhysical container. Device asa4.INTERNAL-pri and asa4.INTERNAL-sec are an example of devices that are physically virtualized but not logically virtualized that are grouped in a vPhysical container.

The server may be further configured to determine characteristics of the devices, wherein the characteristics includes physical only characteristics, virtual physical characteristics or virtual logical characteristics, wherein the device appears one or more times in at least anyone one of a virtual physical, and virtual logical topology maps. The server may be further configured to display devices in cell formatted object with one or more cells used for a device image and one or more cells used for device information. The color of the cell is configured to change manually or dynamically based on information retrieved from the device. The database may comprise auto-discovery tables. The server may further be configured to dynamically add devices to the auto-discovery table and to determine if the device need to be polled, clear the auto-discovery tables and to start adding devices to the tables.

One aspect of the present disclosure is directed to an apparatus to dynamically discover networked devices to create network topology map. The apparatus may comprise a server comprising a processor and memory, wherein the server configured to implement a connection-oriented network protocol command to issue command line interface (CLI) commands to collect data of a plurality of networked devices of a network; extract information via a parser from a command output retrieved in response to the issued command; store the extracted information in an auto-discovery table of a database for retrieval; dynamically add devices to the auto-discovery table of the database; poll the plurality of networked devices periodically; and utilize the stored information to create network topology map.

In one embodiment, the apparatus provides a method to determine characteristics of the devices, wherein the characteristics includes physical only characteristics virtual physical or virtual logical characteristics, wherein the device appears one or more times in a virtual physical (vPhysical) method or a virtual logical (vLogical) method or possibly both a virtual physical and virtual logical method on a virtual physical or virtual logical topology map.

Figure 13:
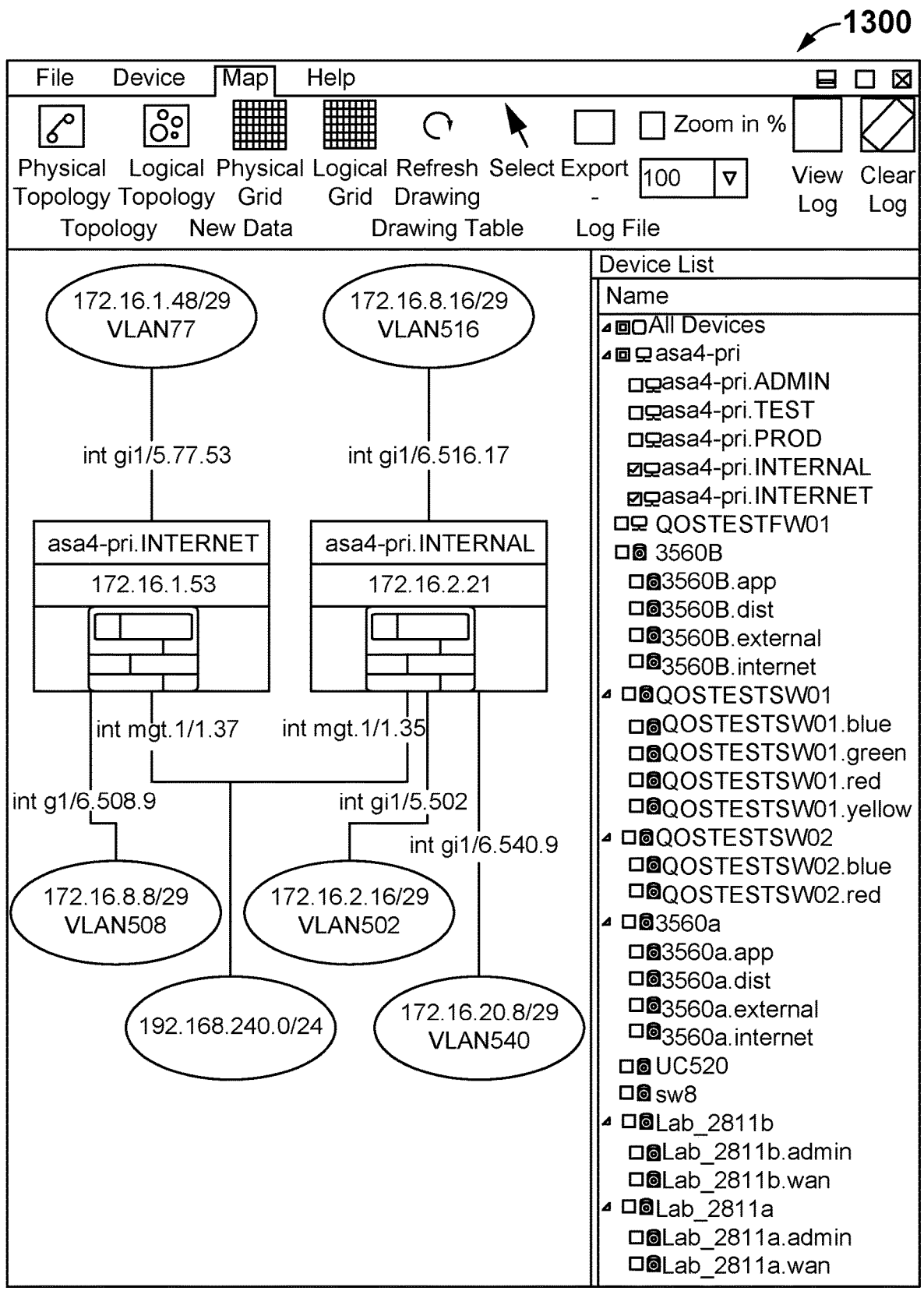
FIG. 13 is a screenshot illustrating determination of virtual physical characteristics, in an embodiment of the present invention.

FIG. 13 illustrates a screenshot 1300 of determination of virtual physical characteristics, in an embodiment of the present invention. FIG. 13 further illustrates the virtual physical configuration of asa4-pri. There are two virtualized physical configurations named INTERNAL and INTERNET. With the Cisco ASA the two virtual configurations are called security context. The two security contexts have separate Layer 3 configurations but they can virtually share the same physical interfaces. This is seen here with interface g1/5 and interface g1/6 displayed with both the INTERNAL and INTERNET security contexts.

Figure 14:
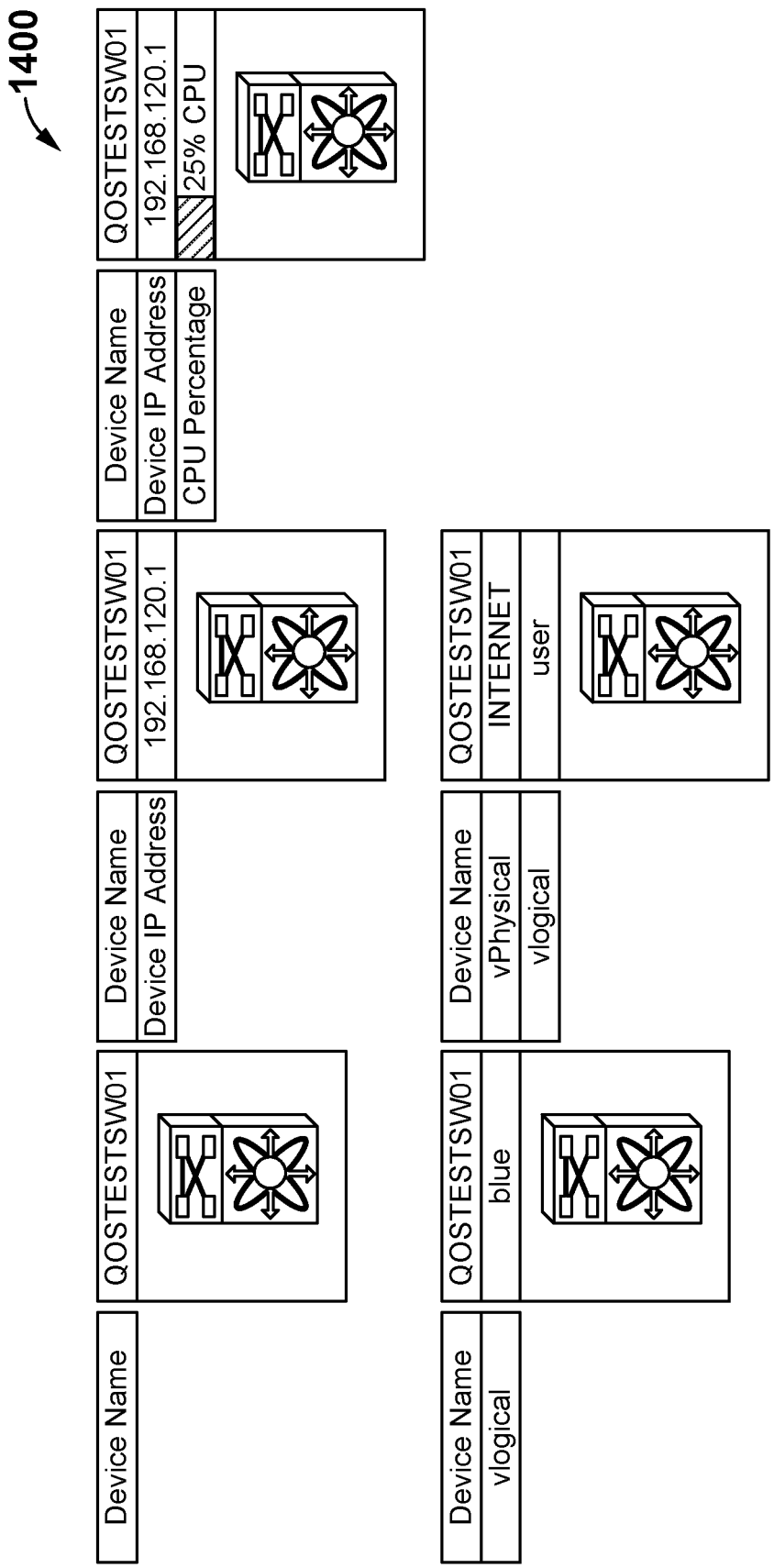
FIG. 14 is a screenshot illustrating display of devices in cell formatted objects, according to an embodiment of the present invention.

In one embodiment, the apparatus discloses a method to display devices in cell formatted object with one or more cells used for a device image and one or more cells used for device information. The color of the cells is configured to change manually or dynamically based on information retrieved from the device. FIG. 14 illustrates a screenshot 1400 of display of devices in cell formatted objects, according to an embodiment of the present invention. In an embodiment, the present invention provides many visual options exists to display the network devices and information about the network devices. These options are part of a cell formatted object. Cells can contain the name of the network device, the IP address of the network device or Key Performance Indicators (KPIs) and any combination of these information fields. The cells are accessible with a right mouse click on a device for specific information about that device or on the topology map to display or make display changes for all devices.

Figure 15:
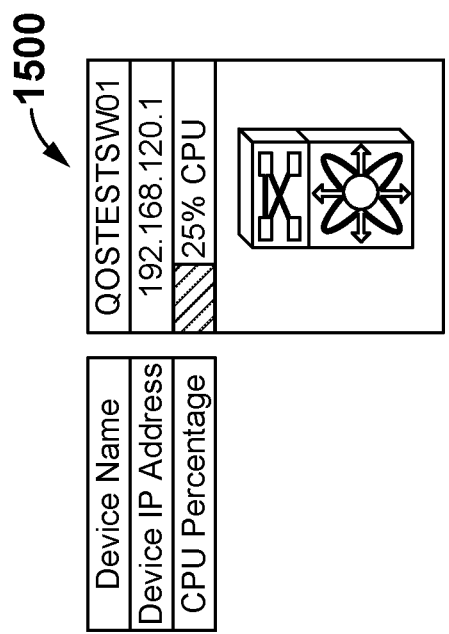
FIG. 15 illustrates a screenshot of dynamic change in color of cells, according to an embodiment of the present invention.

FIG. 15 illustrates a screenshot 1500 of dynamic change in color of cells, according to an embodiment of the present invention. Cells contain Key Performance Indicators (KPIs) and the color of the cells can change dynamically based on the KPI. For example, Central Processing Unit (CPU) is KPI that can change based on the percentage of CPU. Green could be shown for less than 75% utilization, yellow for 75% to 89% utilization and red for utilization of 90% and above.

In one embodiment of the present invention, the apparatus discovers network devices manually or automatically using auto-discovery. The auto-discovery implements seed logic using a seed device. A seed device is a device that is normally a primary device in the network that comprises the most connections to other network devices. In one embodiment, the seed device is discovered and the data is parsed and written to the plurality of tables in the database. In one embodiment, the database comprises auto-discovery tables. The auto discovery table is populated with IP addresses of other devices in the network. In one embodiment, the tables are populated with the contents of the IP ARP table, L2 MAC table and neighbor discovery protocols.

Figure 16:
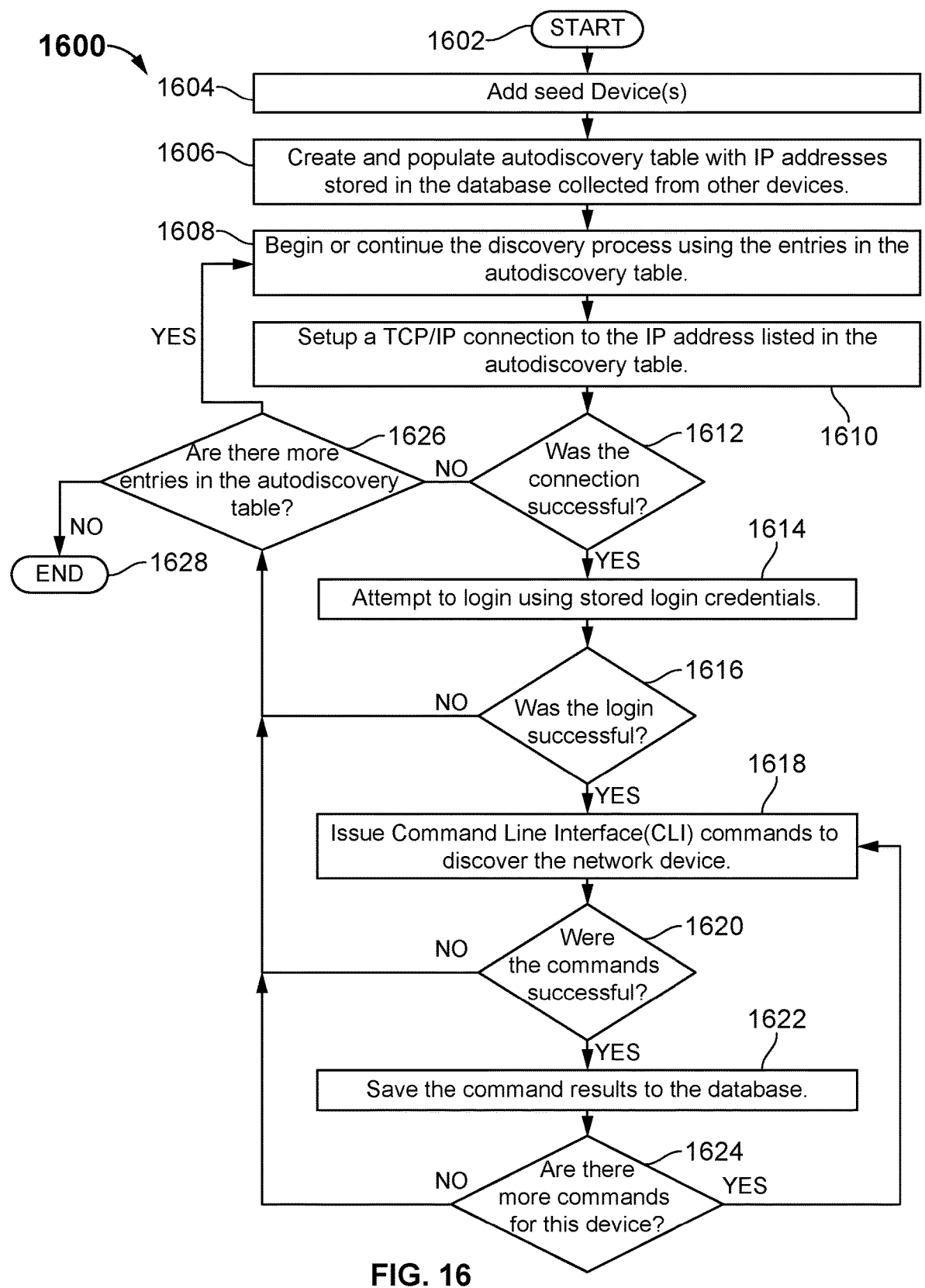
FIG. 16 is a flowchart of method illustrating dynamic addition of devices to the auto discovery tables, according to an embodiment of the present invention.

FIG. 16 is a flowchart of method 1600 illustrating dynamic addition of devices to the auto discovery tables, according to an embodiment of the present invention. At step 1602, the process starts. At step 1604, a seed device is added. At step 1606, autodiscovery table are created and populated with IP addresses stored in the database collected from other devices. At step 1608, the discovery process using the entries in the autodiscovery table is initiated. At step 1610, a TCP/IP connection is setup to the IP address listed in the autodiscovery table.

At step 1612, the connection setup is checked to determine if the connection is successful. If the connection is not successful, the apparatus checks if there are more entries in the autodiscovery table, at step 1626. If there are one or more entries in the autodiscovery tables, the process returns to step 1608. If no entries are found in the autodiscovery table, the process ends at step 1628. If the connection is successful, stored credential is used for login, at step 1614. At step 1616, the logic function is checked to determine if the login attempt is successful. If the login is not successful, the process returns to step 1626. At step 1618, commands are issued to discover the network device command line interface. At step 1620, the logic function is checked to determine if the login attempt is successful. If the login is not successful, the process returns to step 1626. At step 1622, the command results are saved to the database. At step 1624, if there are more commands for the device is checked. If there are no command for this device, the process returns to step 1626. If there are one or more commands for the device, the process returns to step 1618.

In one embodiment, the apparatus includes a flexible credential system for initiating the auto-discovery process. The credential system includes five credential types, which includes default, host IP, host name, group name and network address. FIG. 17 exemplarily illustrates a screenshot 1700 of credential manager according to an embodiment of the present invention. In one embodiment, the default credential is a least specific credential and is used by all auto-discovered IP addresses during unavailability of more specific credential for that IP addresses. In one embodiment, the network address is the next least specific credential and any auto-discovered IP addresses falling within the IP network and IP prefix or subnet mask combination use the corresponding network address credential. In one embodiment, the group name is the next least specific credential to the network address. As companies often add their devices to DNS, when the devices are in DNS, their names could be looked up by IP Address. The apparatus would look up these IPs and try to match the string of characters entered for the group name credential.

In one embodiment, the hostname works the same way as group name except the string of characters is very specific to one device. In one embodiment, the host IP is very specific and match the IP address. In another embodiment, the device could be added manually using the add device tab. The add device tab comprises an option to use the credential manager or enables to enter a credential manually to use when adding the device. In one embodiment, once the devices are successfully discovered, the devices of the network are added to the device list. Referring to FIG. 18 exemplarily illustrates a screenshot 1800 of the device list.

In one embodiment, a user is enabled to select or clear a selection of a device in the device list. In one embodiment, the devices are selected to shown in topology maps or to display data in the data grids. In one embodiment, the topology maps include physical and logical maps. The logical topology map is used to show logical connections of devices. The logical topology map does not show any physical-only devices. For example, an L2 switch would not show up on a logical topology map. In one embodiment, the data grids provide a view of the data used to create the physical and logical topology maps. The data could be exported to multiple formats for further analysis and reporting.

In one embodiment, the apparatus if further configured to provide pop-up data grids, which are accessible by each device displayed on the logical or physical topology maps. The displayed data is filtered for the selected device. The data could be exported to multiple formats for further analysis and reporting. FIG. 19 exemplarily illustrates a screenshot 1900 of a pop-up data grid according to an embodiment of the present invention. In one embodiment, the apparatus further implements continuous polling method to keep data current.

By default, all devices are configured to be polled at a configurable interval for new data, according to one embodiment of the present invention. In one embodiment, the apparatus is configured to enable printing of topologies and data grids. In another embodiment, the apparatus is configured to enable exporting of topologies and data grids in many formats such as Microsoft Visio or by any drawings programs.

Another aspect of the present disclosure is directed to an apparatus to dynamically discover networked devices to create network topology maps. The apparatus may comprise a server comprising a processor and memory. The server may be configured to implement a connection-oriented network protocol to issue command line interface (CLI) commands to collect data of a plurality of networked devices of a network; and extract information via a parser from command output retrieved in response to the issued command. The server may further include storing the extracted information in an auto-discovery table of a database for retrieval; and dynamically adding devices to the auto-discovery table of the database, polling the plurality of networked devices periodically; and using the stored information to create a network topology map. The network topology map may comprise a physical topology map, a virtual physical topology map or a virtual logical topology map. The server may be further configured to determine the devices that are incorrectly determined as physically connected. The server may be further configured to insert a virtual device between devices that are incorrectly determined to be physically connected.

The present disclosure enables to draw the entire network and use L2 and L3 logic to automatically and systematically layout the device. The present disclosure enables to create top-down or left-right network driven layer 2 and layer 3 topology maps. The top-down method provides the most logical flow of a network for troubleshooting. The apparatus further enables to create physical, virtual physical and virtual logical drawings. The apparatus further enables to determine the devices that are incorrectly determined as physically connected and inserts a virtual device between devices that are incorrectly determined to be physically connected.

The apparatus further enables to dynamically add devices to the auto-discovery table and to determine if the device needs to be polled, clear the auto-discovery tables and start adding devices to the tables, the apparatus further enables to determine how the device should be polled, why polling is failed and alternatives for polling the device. For example, provide instruction such as try telnet if SSH is not answered or refused and only connect to devices if they respond to pings.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. An apparatus to dynamically discover networked devices to create network topology map, comprising:

a server comprising a processor and memory, wherein the server configured to implement a connection-oriented network protocol command to issue command line interface (CLI) commands to collect data of a plurality of networked devices of a network;

extract information via a parser from a command output retrieved in response to the issued command;

store the extracted information in an auto-discovery table of a database for retrieval;

dynamically add devices to the auto-discovery table of the database, poll the plurality of networked devices periodically; and utilize the stored information to dynamically discover networked devices to create network topology map.

2. The apparatus of claim 1, wherein the network topology map comprises a physical topology map, a virtual physical topology map or a virtual logical topology map.

3. The apparatus of claim 1, wherein the server is further configured to determine the devices that are incorrectly determined as physically connected and insert a virtual device between devices that are incorrectly determined to be physically connected.

4. The apparatus of claim 1, wherein the server is further configured to display an oval type shape to represent Layer 3 IP subnets as they are displayed on at least one of a logical and Virtual Logical topology maps, wherein one or more data elements relating to the Layer 3 IP Subnet are displayed, wherein the oval shape is the end connection point for devices connected to a Layer 3 IP subnet.

5. The apparatus of claim 1, wherein the server further configured to display a rectangle type shape to represent Layer 2 VLANs as they are displayed on at least one of a physical and virtual Physical topology maps, wherein one or more data elements relating to the Layer 2 VLAN are displayed, wherein the rectangle shape is placed as the intersection of a connection between two devices.

6. The apparatus of claim 1, wherein the server is further configured to determine characteristics of the devices, wherein the characteristics includes physical only characteristics, virtual physical characteristics or virtual logical characteristics, wherein the device appears one or more times in at least anyone one of a virtual physical, and virtual logical topology maps.

7. The apparatus of claim 1, wherein the server further configured to display devices in cell formatted object with one or more cells used for a device image and one or more cells used for device information.

8. The apparatus of claim 7, wherein the cell's color is configured to change manually or dynamically based on information retrieved from the device.

9. An apparatus to dynamically discover networked devices to create network topology map, comprising:

a server comprising a processor and memory, wherein the server is configured to:

implement a connection-oriented network protocol command to issue command line interface (CLI) commands to collect data of a plurality of networked devices of a network;

extract information via a parser from a command output retrieved in response to the issued command;

store the extracted information in a database for retrieval, wherein the database comprises auto-discovery tables; and utilize the stored information to dynamically discover networked devices to create network topology map; and wherein the server is further configured to display an oval type shape to represent Layer 3 IP subnets as they are displayed on at least one of a logical and Virtual Logical topology maps, wherein one or more data elements relating to the Layer 3 IP Subnet are displayed, wherein the oval shape is the end connection point for devices connected to a Layer 3 IP subnet.

10. The apparatus of claim 9, wherein the server is further configured to display a rectangular shaped container to group vPhysical and vLogical representations of devices and their associated connections to the Layer 3 subnets which are depicted as oval type shapes.

11. An apparatus to dynamically discover networked devices to create network topology map, comprising:

a server comprising a processor and memory, wherein the server is configured to:

implement a connection-oriented network protocol command to issue command line interface (CLI) commands to collect data of a plurality of networked devices of a network;

extract information via a parser from a command output retrieved in response to the issued command;

store the extracted information in a database for retrieval, wherein the database comprises auto-discovery tables; and utilize the stored information to dynamically discover networked devices to create network topology map; and wherein the server is further configured to display a rectangle type shape to represent Layer 2 VLANs as they are displayed on at least one of a physical and virtual Physical topology maps, wherein one or more data elements relating to the Layer 2 VLAN are displayed, wherein the rectangle shape is placed as the intersection of a connection between two devices.

* * * * *